United States Patent
Callaway et al.

(10) Patent No.: US 8,032,636 B2
(45) Date of Patent: Oct. 4, 2011

(54) DYNAMICALLY PROVISIONING CLUSTERS OF MIDDLEWARE APPLIANCES

(75) Inventors: Robert D. Callaway, Holly Springs, NC (US); Adolfo F. Rodriguez, Raleigh, NC (US); Yannis Viniotis, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 12/366,453

(22) Filed: Feb. 5, 2009

(65) Prior Publication Data

US 2010/0198971 A1    Aug. 5, 2010

(51) Int. Cl.
*G06F 15/173* (2006.01)
*G06F 15/16* (2006.01)

(52) U.S. Cl. ........ 709/226; 709/223; 709/224; 709/225; 709/227; 709/220; 706/17; 706/19; 706/20; 706/44; 706/53; 719/320; 707/103

(58) Field of Classification Search .......... 709/226, 709/206, 203, 202, 219, 208, 223, 238, 244, 709/22

See application file for complete search history.

(56) References Cited

U.S. PATENT DOCUMENTS 6,757,723 B1 * 6/2004 O'Toole et al. ............... 709/222
7,139,817 B1   11/2006 English et al.

OTHER PUBLICATIONS

Rodriguez et al., "IBM WebShare DataPower SOA Appliances Part 1:Overview and Getting Started", Red Paper, ibm.com/redbooks, Apr. 2008.
IBM WebSphere DataPower Integration Appliance X150—Features and benefits; www-306.ibm.com/software/integration/datapower/xi50/features/; Aug. 11, 2008.
IBM WebSphere DataPower XML Security Gateway XS40—Features and benefits; www-306.ibm.com/software/integration/datapower/xs40/features/; Aug. 11, 2008.
IBM WebSphere DataPower XML Accelerator XA35—Features and benefits; www-306.ibm.com/softward/integration/datapower/xa35/features/; Aug. 11, 2008.

* cited by examiner

*Primary Examiner* — Jude J Jean Gilles
(74) *Attorney, Agent, or Firm* — Jeffrey T. Holman

(57) ABSTRACT

A method, computer program product, and system are disclosed for dynamically provisioning clusters of middleware appliances. In one embodiment, the method includes referencing a resource measurement from a plurality of middleware appliances. The middleware appliances process one or more service domains and the resource measurement includes processing resources consumed by each middleware appliance for each of the one or more service domains. The method may also include determining an implementation plan based on a performance goal and one or more resource calculations. The implementation plan specifies service domain instances to activate and service domain instances to deactivate on the plurality of middleware appliances. The method may also include dynamically enabling and disabling the service domain instances on the plurality of middleware appliances based on the implementation plan.

22 Claims, 6 Drawing Sheets

400

|  | SD1 | SD2 | SD3 | ... | SDM |
|---|---|---|---|---|---|
| App 1 | U11 | U12 | U13 | U14 | U15 |
| App 2 | U21 | U22 | U23 | U24 | U25 |
| ... | U31 | U32 | U33 | U34 | U35 |
| App N | U41 | U42 | U43 | U44 | U45 |

402

|  | SD1 | SD2 | SD3 | ... | SDM |
|---|---|---|---|---|---|
| App 1 | 30% | 20% | 40% | 10% | 00% |
| App 2 | 40% | 20% | 30% | 00% | 10% |
| ... | 30% | 20% | 30% | 10% | 10% |
| App N | 10% | 10% | 50% | 10% | 10% |

|  | SD1 | SD2 | SD3 | ... | SDM |
|---|---|---|---|---|---|
| App 1 | 2 | 1 | 1 | 0 | 0 |
| App 2 | 1 | 0 | 3 | 2 | 3 |
| ... | 1 | 2 | 0 | 0 | 1 |
| App N | 0 | 1 | 4 | 3 | 4 |

| Domain | SD1 | SD2 | SD3 | SD4 | SD5 |
|---|---|---|---|---|---|
| Up Tolerance | UT1 | UT2 | UT3 | UT4 | UT5 |
| Down Tolerance | DT1 | DT2 | DT3 | DT4 | DT5 |
| Example | 0.10% | 1.00% | 10.00% | 1.50% | 10.00% |

FIG. 4C

DYNAMICALLY PROVISIONING CLUSTERS OF MIDDLEWARE APPLIANCES

BACKGROUND OF THE INVENTION

1. Field of the Invention

This invention relates to middleware appliances and more particularly relates to dynamically provisioning clusters of middleware appliances.

2. Description of the Related Art

Service Oriented Architecture (SOA) middleware appliances such as WebSphere® DataPower® appliances from International Business Machines (IBM) are functionally purposed hardware appliances that perform traditional middleware intermediary functions such as protocol bridging and deep-content routing. The emergence of middleware-purposed hardware and lightweight middleware stacks has overcome the performance burden stemming from the increased processing requirements of SOA-based and middleware payloads.

Unfortunately, these advances have not come without challenges. For simplicity, SOA appliances are stand-alone hardware entities with minimal support for clustering or grouping of like-purposed appliances. However, SOA appliances are generally deployed in multiples of two or more to provide sufficient processing power and to meet high availability requirements. The end result is an administrative burden where a user must properly manage the SOA clusters together as a collective whole.

From a configuration point of view, protocols and management frameworks such as the Appliance Management Protocol (AMP) and IBM Tivoli® Composite Application Manager System Edition for WebSphere DataPower (ITCAMSE4WDP), have helped to reduce this burden by providing a mechanism for dynamically synchronizing configuration across like-purposed appliances via a container object referred to as a service domain. These service domains consist of one or more service objects that indicate how the appliance will function. At a high-level, a service domain corresponds to a deployed application or related applications.

However, provisioning service domains among appliances still proves difficult. At present, appliance owners over-provision their appliance clusters and use manual, ad-hoc strategies to provision their appliance clusters among competing services. A typical provisioning objective, known as service differentiation, is to allocate a percentage of Central Processing Unit (CPU) cycles in the entire appliance cluster to a given service domain; this percentage may change, based on whether the system is under- or over-loaded. For example, an administrator may wish to allocate up to 50% of total CPU cycles to a particular service domain in underloaded conditions and 70% in overloaded conditions.

Two known solutions exist for providing differentiated services. Both approaches assume the existence of an HTTP router/IP sprayer (sprouter) to distribute service load to the appliance cluster. The sprouter is a device without deep-content inspection intelligence that simply routes on, for example, a URL, and uses IP spraying to send traffic to appliance replicas.

In a first approach, a system administrator groups all middleware appliances in a single group and enables them all to process service requests for any given service. The appliances are manually configured with all service objects and their corresponding service domains enabled (ITCAMSE4WDP could dynamically copy this manual configuration from one device to the rest). The fronting IP sprayer forwards a service request to each of the middleware appliances, routing the request to the appropriate service port for service-specific processing. The service flow would then load-balance the requests to backing service replicas. This approach suffers from a number of drawbacks. First, in enabling all service domains on every appliance, it is very difficult to manually implement differentiated services across service domains competing for the same appliance resources.

While an IP sprayer can effectively spread the load amongst the different appliances, the IP sprayer cannot gauge the effect of a specific service request on CPU and thus cannot provide differentiated service amongst the competing service domains. For example, assuming that three middleware appliances are in use, if the administrator wishes to allocate up to 50% of total CPU to a particular service domain, the system as whole can only hope to evenly spread across the appliances, which, under overload conditions, leads to each service domain receiving ⅓ (33%) of the total CPU cycles. So rather than getting 50% CPU utilization for a service domain in a particular SOA appliance the maximum is 33%. A secondary problem is that it becomes nearly impossible to effect any spatial locality with this solution. Spatial locality involves focusing a service domain on specific middleware appliances to increase the likelihood that similar memory locations will be accessed repeatedly. In many realistic cases, performance can be improved by concentrating requests for a specific service domain together, for example, to increase cache hit rates.

In a second approach, the administrator statically allocates a portion of the appliances to each of the service domains. In this case, each middleware appliance is assigned one or more specific service domains that it will serve as opposed to each appliance receiving service assignments dynamically. In this way, service requests for a specific service domain are concentrated on specific appliances, thus achieving spatial locality. Further, the administrator can allocate appliances for service domains proportional to the intended capacity (and to some extent priority) for each individual service, thus achieving some level of differentiated service. However, this approach also has drawbacks. First, it is difficult to leverage unused resources of appliances serving one service for satisfying requests intended for overloaded appliance and its service. Therefore, under certain conditions, many of the overall system resources may be under-utilized. Second, the allocation process is manual and cannot adapt to changing request rates and prevailing conditions. This could lead to inefficient resource partitioning and ultimately violate intended differentiated service goals.

In summary, both known conventional solutions to the appliance provisioning problem result in (a) inefficient use of appliance resources, and, (b) the inability to provide actual service differentiation.

SUMMARY OF THE INVENTION

The present invention has been developed to provide for dynamically provisioning clusters of middleware appliances.

A method is presented for referencing a resource measurement from a plurality of middleware appliances, determining an implementation plan based on a performance goal and one or more resource calculations, and dynamically enabling and disabling the service domain instances on the plurality of middleware appliances.

In one embodiment, the method includes referencing a resource measurement from the plurality of middleware appliances. The middleware appliances process one or more service domains and the resource measurement includes processing resources consumed by each middleware appliance for each of the one or more service domains. Each service domain includes one or more service domain instances and each service domain instance comprises a replica of a service domain. The method may also include determining an implementation plan based on a performance goal and one or more resource calculations. The implementation plan may designate service domain instances to activate and service domain instances to deactivate on the plurality of middleware appliances. Furthermore, the performance goal may include target processing resource usage for the one or more service domains. The method may also include dynamically enabling service domain instances and disabling service domain instances on the plurality of middleware appliances based on the implementation plan.

In another embodiment, the method includes evaluating a performance difference which is the difference between the resource measurement for each middleware appliance and the performance goal. In one embodiment, the implementation plan implements one or more of service differentiation and spatial locality. The method may also store the resource measurement in a utilization matrix, the utilization matrix configured to record Central Processing Unit (CPU) usage for a service domain for each middleware appliance. In addition, the performance goal may be an unqualified goal and an overload protection goal.

The one or more resource calculations may include calculating an actual CPU cycle percentage for a service domain. Furthermore, the actual CPU cycle percentage for a service domain may be calculated as in the equation: $X_s(T_k)=1/k [U_{1s}+U_{2s}+\ldots+U_{Ns}]/N+(k-1)/kX_s(T_{k-1})$. In this equation, k is a decision instant counter, $T_k$ is a specific time, s is the service domain, N is the number of middleware appliances, and $U_{Ns}$ is CPU cycle percentage for the service domain in middleware appliance N.

In one embodiment, the actual CPU cycle percentage for a service domain is calculated in an overload condition and in an underload condition. Furthermore, one of the resource calculations may include calculating an overhead threshold. The overhead threshold may determine whether to activate and deactivate service domain instances in response to a failed performance goal.

A computer program product is also presented for dynamically provisioning clusters of middleware appliances. The computer program product may include a reference module, an evaluation module, a determination module, and an implementation module. In some embodiments, the computer program product includes a utilization module an instantiation module and a calculation module. In addition, in some embodiments, the determination module includes a threshold module.

The plurality of middleware appliances may comprise a plurality of Service Oriented Architecture (SOA) appliances. The resource measurement may comprise CPU resources consumed by each SOA appliance for each of the one or more service domains. Additionally, each service domain instance may comprise a replica of a service domain. Furthermore, the instantiation module may represent the service domain instances for each SOA appliance in an instantiation matrix. In one embodiment, the performance goal comprises target CPU usage for the one or more service domains. The modules of the computer program product may be configured to functionally perform the necessary steps as described above in relation to the method.

A system of the present invention is also presented for dynamically provisioning clusters of middleware appliances. The system may be embodied as a network, one or more clients, a Hypertext Transfer Protocol (HTTP) Router/Internet Protocol (IP) sprayer, a plurality of SOA appliances. The system may also include an internal network, one or more service providers, and a provisioning agent. The provisioning agent may comprise modules similar to the modules described above in relation to the computer program product and also configured to functionally perform the necessary steps as described above in relation to the method. In one embodiment, the HTTP Router/IP sprayer routes HTTP requests to the one or more communication ports for each activated service domain instance.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings, in which:

FIG. 4A is one embodiment of a utilization matrix;

FIG. 4B is one embodiment of an instantiation matrix;

FIG. 4C is one embodiment of a threshold tolerance vector;

DETAILED DESCRIPTION OF THE INVENTION

Figure 1:
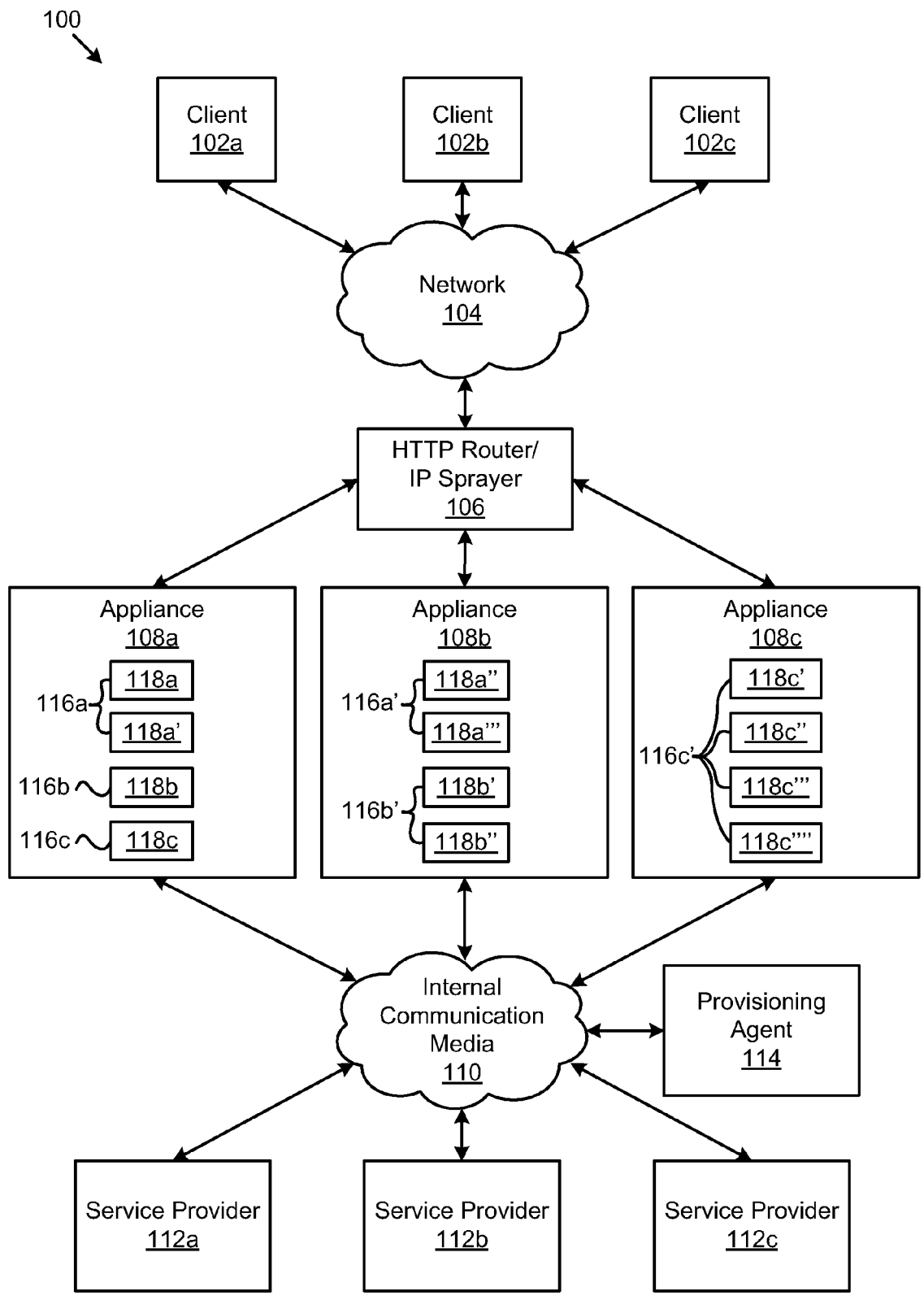
FIG. 1 is a schematic block diagram illustrating one embodiment of a system for dynamically provisioning clusters of middleware appliances.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and maybe embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium maybe utilized. The computer-usable or computer-readable medium may be, for example but not limited to, an electronic, magnetic, optical, electromagnetic, or semiconductor system, apparatus, device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates one embodiment of a system 100 for dynamically provisioning clusters of middleware appliances. The system 100 includes a network 104, one or more clients 102, a Hypertext Transfer Protocol (HTTP) Router/Internet Protocol (IP) sprayer (sprouter) 106, and a plurality of middleware appliances 108. The system may also include an internal communication media 110, one or more service providers 112, and a provisioning agent 114. Those of skill in the art recognize that the system 100 may be simpler or more complex than illustrated, so long as the system 100 includes modules or sub-systems that correspond to those described herein.

A client 102a may be a desktop computer, a server, a handheld computing device, a portable computer, a mainframe, and the like. Furthermore, a client 102a may send requests using Simple Object Access Protocol (SOAP) and Hypertext Transfer Protocol (HTTP). Furthermore, each client 102 may be in communication with a network 104. The network 104 may comprise a global communications network such as the Internet, a Local Area Network (LAN), a plurality of LANs communicating over the internet, or any other similar communications network.

An HTTP router/IP sprayer (sprouter) 106 is in communication with the network 104. The sprouter 106 may distribute HTTP client requests among the appliance cluster and use IP spraying to send client traffic to active service domain instances. In one embodiment, the sprouter 106 comprises limited logic in determining how to distribute HTTP client requests. The sprouter 106 does not receive any feedback from the appliance cluster regarding resource usage and does not consider resource usage when distributing traffic. The sprouter learns that a communication port is available via either a predefined list of ports per service domain, or through a management protocol that runs between the sprouter and the group of appliances and/or the provisioning agent. When the sprouter 106 determines that a communication port is available to receive a client request, the sprouter 106 distributes a client request to that port without any intervening logic.

Furthermore, the sprouter 106 is operationally coupled to an appliance cluster consisting of a plurality of middleware appliances 108. As is known by one of ordinary skill in the art, a middleware appliance 108 (hereinafter "appliance") may comprise a Service Oriented Architecture (SOA) appliance such as an IBM WebSphere® DataPower® appliance or other middleware appliance capable of sending, receiving, routing, and accelerating Extensible Markup Language (XML) messages and other message formats. An appliance 108*a* may contain one or more processors. Furthermore, in a preferred embodiment, an appliance 108*a* is a hardware appliance that includes logic implemented in hardware and software. Additionally, the appliance 108*a* maybe capable of processing one or more service domains 116.

A service domain 116 is a logical grouping of related services on a single appliance 108*a* that is configured to provide value-added services to application traffic (requests and responses) that flows through the appliance 108*a*. An appliance 108*a* may process a plurality of service domains 116 active concurrently, each of which will cooperatively share the physical resources of the appliance 108*a* such as one or more processors, memory, network bandwidth, and the like. Examples of services that may belong to a service domain 116 include an XML firewall service, message translation services, and other similar web services. Furthermore, a service domain 116 may comprise one or more service domain instances 118. A service domain instance 118 is a replica or copy, of a service domain 116. In addition, a plurality of service domain instances 118 may exist on a single appliance 108*a*. Each service domain instance 118 has a certain number of communication ports associated with the instance. Therefore, the more service domain instances 118 that run on an appliance 108*a*, the more communication ports become available to receive requests from the sprouter 106, and the more processing power is devoted to the service domain 116 that corresponds to the service domain instances 118.

In the depicted embodiment, appliance 108*a* is processing three service domains: service domain 116*a*, service domain 116*b*, and service domain 116*c*. Furthermore, appliance 108*a* is processing two service domain instances of service domain 116*a*: service domain 118*a* and service domain 118*a'*. Appliance 108*a* is processing one service domain instance of service domain 116*b* and service domain 116*c*: service domain instance 118*b* and service domain instance 118*c*. Appliance 108*b* is processing two service domains: service domain 116*a'* and service domain 116*b'*. However, appliance 108*b* is processing two service domain instances for each service domain (116*a'* and 116*b'*).

In the depicted embodiment, service domain 116*a'* is identical to service domain 116*a*, but is labeled as 116*a'* to clarify that 116*a'* resides on a different appliance 108*b* than service domain 116*a*. The service domain instances 118 have been similarly labeled to clarify that each instance is an independent copy of the service domain 116 in which it represents. For example, service domain 116*a'* running on appliance 108*b* has two associated instances: service domain instance 118*a''* and service domain instance 118*a'''*, both representing independent, identical copies of the service domain 116*a'*.

Furthermore, appliance 108*c* is processing only one service domain 116*c'*. However, appliance 108*c* is processing four service domain instances (118*c'*-118*c''''*) of service domain 116*c'*. The more service domain instances 118 that run on an appliance, the more CPU resources are allocated to the corresponding service domain 116. Therefore, on appliance 108*a*, service domain 116*a* receives more CPU resources than service domain 118*b* and service domain 118*c*.

The appliances 108 are in communication with an internal communication media 110. In one embodiment, the internal communication media 110 is a network such as a LAN, a plurality of LANs, or other similar network. In a preferred embodiment, the internal communication media 110 is a localized intranet. In another embodiment, the internal communication media 110 is a communication bus or direct cable connection such as a serial or parallel cable connection.

Furthermore, a plurality of service providers 112 are in communication with the internal communication media 110. In this manner, each appliance 108 may communicate with the service providers 112 corresponding to the service domains 116 that the appliance 108 is processing. A service provider 112*a* is an application entity that implements and exposes some business logic or process for the benefit of its consumers. Examples of service providers include network service providers such as an internet service provider and application service providers such as web hosting providers or credit card payment processing applications.

A provisioning agent 114 is also in communication with the internal communication media 110. The provisioning agent 114 may reside on a separate device as illustrated. In another embodiment, the provisioning agent 114 may reside on an appliance 108 or hardware implementing the service provider 112.

The provisioning agent 114 receives runtime statistics from each appliance 108 regarding the resource consumption of service domains 116 within the appliances 108, determine based on those statistics how well specified performance goals are being met, and dynamically activate or deactivate service domains 116 in each appliance 108 to control service domain processor allocation. By controlling the number of service domain instances 118 running on an appliance 108, the provisioning agent 114 controls the number of available communication ports to receive requests from the sprouter 106.

The provisioning agent 114 allows an administrator to allocate a percentage of CPU cycles in the entire appliance cluster to each service domain, thus achieving actual service differentiation. Furthermore, the provisioning agent 114 also allows an administrator to group a plurality of service domain instances 118 on a single appliance 108 to take advantage of common memory locations and caching, thus utilizing appliance resources in an efficient manner and increasing spatial locality. In addition, the provisioning agent 114 does not require manual configuration. An administrator may, by using the provisioning agent 114, have greater control over the amount of CPU cycles to devote to each service domain 116 on a specified appliance 108.

The provisioning agent 114 works with existing conventional sprouters 106 that contain no internal logic to recognize content or to perform load balancing based on resource usage by service domains 116. Finally, the provisioning agent 114 can also work with existing appliances 108 without having to implement priority-based scheduling of service domains 116 at the appliance level.

Therefore, the provisioning agent 114 saves time and monetary resources because conventional equipment such as sprouters 106 and appliances 108 do not require modification. In a typical middleware system operated by a customer, appliances 108 are purchased from third party sources. Furthermore, these existing appliances 108 can not be modified by the customer. In other words, the administrator can not change the firmware or logic of the appliance in order to accomplish service differentiation. Therefore, the administrator is unable to achieve actual service differentiation with the appliances 108 alone. However, with the present invention an administrator can add a provisioning agent 114 to an existing system to provide actual service differentiation without the need to modify the appliances 108.

The following definitions relate to the logic of the provisioning agent 114 and will be used hereafter:
- k: a decision instant, or time interval counter.
- s: a service domain.
- $T_k$: the "k-th" decision instant, at which activation/deactivation decisions are made by the provisioning agent. "$T_k$" can form a periodic sequence, or it can be the beginning of the "k-th" overload period, based on the goal to achieve. It is assumed "$T_0$"=0.
- $P_s$: the desired target percentage of CPU cycles service domain "s" should get, over the entire cluster of appliances.
- $P_o(s)$: the desired target percentage of CPU cycles service domain "s" should get, over the entire cluster of appliances during overload conditions.
- $P_u(s)$: the desired target percentage of CPU cycles service domain "s" should get, over the entire cluster of appliances during underload conditions.
- $U_{as}$ the CPU utilization for service domain "s", as a percentage.
- $X_s(T_k)$: the actual percentage of CPU cycles service domain s actually got, over the entire cluster, from time 0 till time "$T_k$". Initially, "$X_s(0)$"=0.
- N: number of appliances in the cluster.
- M: number of service domains in the system.

Figure 2:
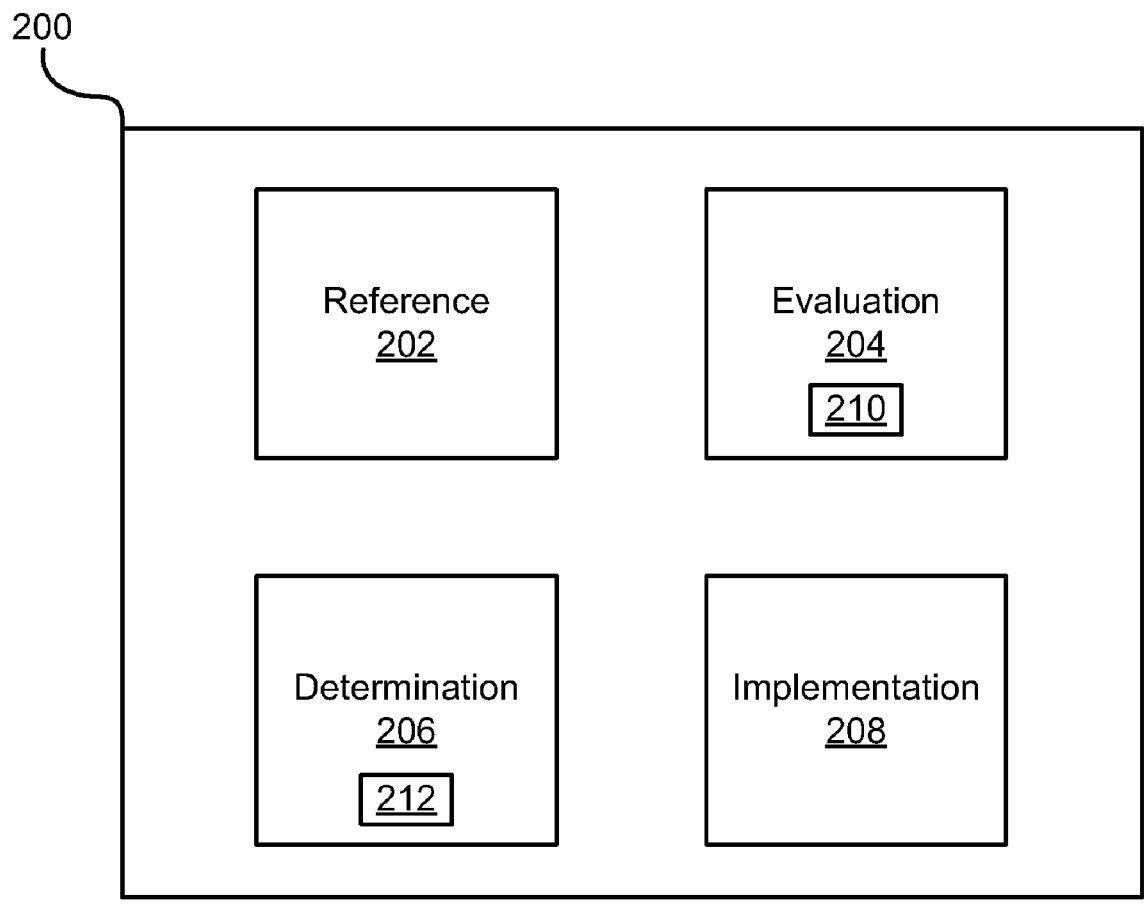
FIG. 2 is a schematic block diagram illustrating one embodiment of a computer program product for dynamically provisioning clusters of middleware appliances.

FIG. 2 illustrates one embodiment of a computer program product 200 for dynamically provisioning clusters of middleware appliances. The computer program product 200 may comprise the provisioning agent 114 in FIG. 1. The computer program product in the pictured embodiment includes a reference module 202, an evaluation module 204, determination module 206, and an implementation module 208. Furthermore, the evaluation module 204 includes a performance goal 210 and the determination module includes an implementation plan 212.

In one embodiment, the reference module 202 references a resource measurement from the appliances 108. The resource measurement indicates processing resources consumed by each appliance 108a for the service domains 116 running on that appliance 108a for a specific span of time. In one embodiment, the resource measurement comprises the CPU resources consumed by a particular service domain 116 at each appliance 108a. For example, at appliance 108a, the reference module 202 measures "$U_{as}$," the CPU utilization for service domain "s", as a percentage. This CPU utilization measurement is not cumulative; in other words, it gives the percent of CPU time allocated to particular service domain "s" within the current measurement period only. In addition, the reference module 202 may reference the CPU utilization for each service domain 116 for each appliance 108 to determine the cluster-wide utilization.

In one embodiment, the reference module 202 references the measurement data from the appliances 108 using conventional middleware appliance management protocols. On a WebSphere® DataPower® appliance, such management protocols include the Appliance Management Protocol (AMP). The AMP implements a series of commands that enable an administrator to manage the appliance 108a. The reference module 202 may use these preexisting management protocol commands to obtain the resource measurement. In certain embodiments, the reference module 202 obtains the resource measurement from the appliances 108 by polling or querying the appliances 108, by receiving the data sent from the appliances 108, by referencing a file created by the appliances 108, and the like.

The reference module 202 may reference the resource measurement from the appliances 108 according to a predetermined time interval, or decision instant. Furthermore, the time interval may be user configured and may vary according to whether the appliances 108 are in an overload condition. For tighter control over the appliances, the time interval may be shorter.

In one embodiment, the evaluation module 204 evaluates a performance difference that is a difference between the resource measurement for each appliance 108a and a performance goal 210. The performance goal 210 may provide a target resource usage for a service domain 116 cluster wide, or may provide a target resource usage for a service domain 116 per appliance 108a. The target resource usage may be a measure of CPU usage or a percentage of CPU usage on the service domain. Furthermore, the performance goal 210 may comprise an unqualified goal and an overload protection goal.

An unqualified goal is a static goal that does not depend on overload conditions. For example, an unqualified goal may allow service domain "s" up to a percent, "$P_s$", of the CPU cycles in the appliance cluster (e.g., 90%). No response time guarantees or constraints are implied in an unqualified goal.

An overload protection goal provides service differentiation taking into consideration overload conditions. For example, an overload protection goal may dictate that when the system is underloaded, give service domain "s" up to a percent, "$P_u(s)$", of the CPU cycles in the appliance cluster (e.g., 50%). When overload occurs, give service domain "s" up to another percent, "$P_o(s)$", of the CPU cycles in the appliance cluster (e.g., 90%). As with the unqualified goal, no response time guarantees or constraints are implied in an overload protection goal.

As is known by one of ordinary skill in the art, the conditions that constitute overload may vary. For example, the administrator may specify overload as having global (cluster-wide) CPU consumption over a configurable threshold (say 80%). Furthermore, an unqualified goal is a special case of an overload protection goal. Specifically, if the percentages "$P_u(s)$" and "$P_o(s)$" are set the same, an overload protection goal becomes an unqualified goal. From a customer perspective, both goals are easy to specify; they do not require any knowledge about service domain 116 statistical behavior. In addition, the goals are expressed in terms of "up to" a percent, since, especially in underload situations, a service domain 116 may not actually present enough requests to consume the desired CPU percentile.

Both goals may be satisfied with the same algorithm and the same collected resource measurements. The only difference is how the measurement periods are classified as overload or underload and thus how the measurements are processed to calculate "$X_s(T_k)$", or the actual percentage of CPU cycles service domain "s" actually got, over the entire cluster, from time 0 until time "$T_k$".

The evaluation module 204 evaluates whether each appliance 108 is meeting the desired performance goal 210. In one embodiment, the evaluation module 204 checks if the CPU percentage for a service domain 116 of each or all appliances 108 is below or above the desired target "$p_s$". Based on the comparison, the differences "$X_s(T_k)-p_s$" will be a positive or negative number. A positive difference indicates better performance than the specified target "$p_s$"; a negative difference is indicative of worse performance than the specified target "$p_s$". The goal of this algorithm is to iteratively adjust the number and placement of service domain instances on the group of appliances such that the differences computed for all service domains is as close to zero as possible.

The target percentage, "$p_s$", used in this comparison will depend on the goal. The target percentage may be one of the constants "$P_s$", "$P_u(s)$" or "$P_o(s)$", modified according to thresholding operations.

In one embodiment, the determination module 206 determines an implementation plan 212 based on the performance difference and various resource calculations. The implementation plan 212 may designate which service domain instances 118 on the appliances 108 to activate and which service domain instances 118 on the appliances 108 to deactivate. Specifically, the determination module 206 may divide the service domains 116 into two groups, based on whether the performance difference for each service domain 116 is >0 or <0.

In one embodiment, when the difference is greater than zero, the service domain 116 meets or exceeds its target; hence the service domain 116 could be deactivated in some or all of the appliances 108. The deactivation group (Group D) contains service domains 116 that are candidates to be deactivated. Therefore, when the difference is greater than zero, the determination module 206 places the service domain 116 in Group D.

When the difference is less than zero, the service domain 116 misses its target and fails the performance goal 210; hence, the service domain 116 could be activated in one or more of the appliances 108 (if the service domain 116 is not active in all of the appliances 108). The activation group (Group A) contains service domains 116 that are candidates to be activated. Therefore, when the difference is less than zero, the determination module 206 places the service domain 116 in Group A.

The determination module 206 uses the performance difference and the activation group and deactivation group to determine an implementation plan 212. The following three examples describe possible implementation plans 212.

EXAMPLE 1

1. Deactivate one instance of every service domain in Group D in appliances that run service domains in Group A. This will free up CPU cycles for use by domains in set A (if no service domains are grouped in Group A, no deactivation actually takes place).
2. Activate one instance of every service domain in Group A in appliances that run service domains in Group A.

The above implementation plan 212 will, in all likelihood, achieve desired percentiles "slowly"; it may actually decrease the percentile of a service domain 116 in Group A before increasing it.

EXAMPLE 2

1. Deactivate one instance of every service domain in Group D in appliances that run service domains in Group A. This will free up CPU cycles for use by service domains in Group A. Denote the number of appliances with freed up slots for service domains by "F" (if there are no service domains in Group A, no deactivation actually takes place).
2. Order the service domains in Group A, from most- to least-hurting. Activate one instance of every service domain in Group A, until the "F" slots are used.

EXAMPLE 3

1. Deactivate one instance of every service domain in Group D, in appliances that run service domains in group A. This will free up CPU cycles for use by domains in Group A. Denote the number of appliances with freed up slots by "F" (if there are no domains in Group A, no deactivation actually takes place).
2. Order the service domains in Group A, from most- to least-hurting. Activate one instance of every service domain in Group A until the "F" slots are used.
3. Apply a "bin-packing" algorithm, as is known in the art, to shift multiple instances of a service domain from one appliance to another.

In one embodiment, the implementation module 208 dynamically activates and deactivates the service domain 116 instances on the appliances 108 based on the implementation plan 212. The implementation module 208 may duplicate, activate, and deactivate service domain instances 118 using the middleware appliance management protocols such as AMP. The implementation module 208 may use these management protocol commands to import service domains 116 at an appliance 108a and then start/stop service domains instances 118 dynamically. By so doing, the number of communication ports will increase or decrease for the service domains 116 according to the number of service domain instances 118 the appliance 108 is processing. The sprouter 106 will recognize that more ports are available and send requests to the new ports or cease sending requests to ports from deactivated service domains 116. Consequently, no specific commands need to be sent to the sprouter 106 and no logic of the sprouter 106 needs to be changed to support embodiments of the current invention. Indeed, in certain embodiments, the sprouter 106 can not be altered and so the present invention, using the implementation plan, provides actual service differentiation and spatial locality in environments with conventional sprouters 106. This saves costs and time in implementing the present invention.

Figure 3:
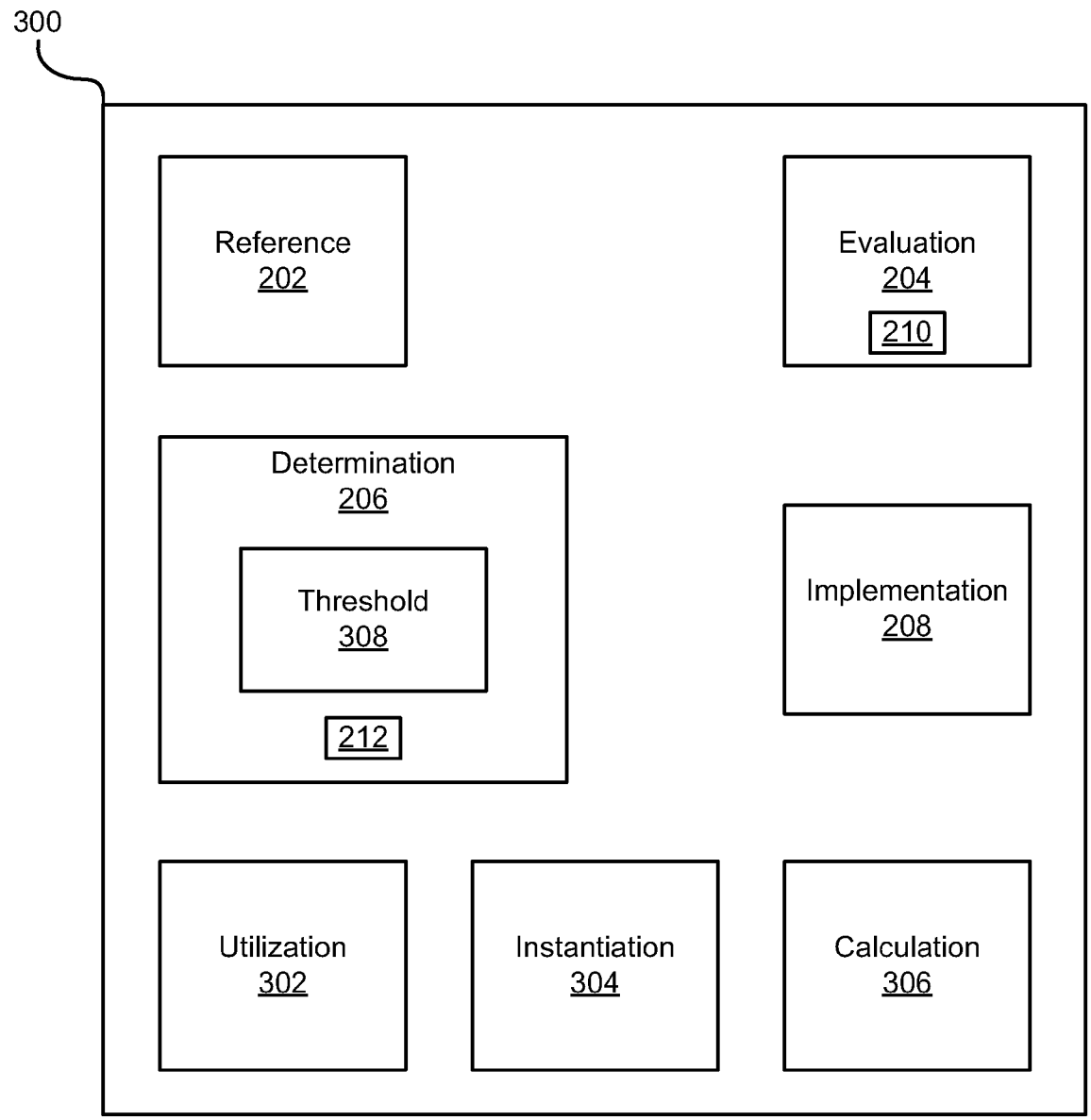
FIG. 3 is a detailed schematic block diagram illustrating one embodiment of a computer program product for dynamically provisioning clusters of middleware appliances.

FIG. 3 illustrates another embodiment of a computer program product 300 for dynamically provisioning clusters of middleware appliances. The computer program product 300 includes the reference module 202, the evaluation module 204, the determination module 206, and the implementation module 208, wherein these modules include substantially the same features as described above in relation to FIG. 2. Also depicted are the performance goal 210 and implementation plan 212. Additionally, in one embodiment, the computer program product 300 contains a utilization module 302, an instantiation module 304, a calculation module 306 and the determination module 206 contains a threshold module 308.

In one embodiment, the utilization module 302 stores the resource measurement in a utilization matrix. The utilization matrix records CPU usage for each service domain 116 for each appliance 108.

Referring now to FIGS. 3 and 4A, assuming a matrix 400 with N appliances 108 and M service domains 116 the utilization module 302 forms a matrix U 400, the rows of which correspond to appliances 108 and the columns of which correspond to service domains 116. FIG. 4A shows one example of a utilization matrix 400. The elements of this matrix 400 represent CPU utilization, per service domain 116, per appliance 108. Summation of the elements down a column indicates the total CPU utilization per service domain 116. Summation of the elements across a row indicates the total CPU utilization per appliance 108. The total CPU utilization per appliance 108 may be a number up to 100%. FIG. 4A also shows an example of a utilization matrix 402 with sample CPU utilization values.

Referring now to FIGS. 3 and 4B, in one embodiment, the instantiation module 304 represents the service domain instances 118 for each appliance 108 in an instantiation matrix 404. A plurality of instances of a given service domain 116 may be activated per appliance 108, thereby increasing the CPU utilization consumed by the service domain 116. The instantiation module 304 may track these instances in a matrix 404 as shown in FIG. 4B. The elements of this matrix 404 represent service domain instances 118, per service domain 116, per appliance 108. Summation of the elements down a column indicates the total number of service domain instances 118 per service domain 116. Summation of the elements across a row indicates the service domain instances 118 per appliance 108.

For example, suppose that appliance App 1 is running two instances of SD1, one instance of SD2, and one instance of SD3 as shown in matrix 404. The expected utilization across the three domains would then be 50%, 25% and 25% respectively, in overload situations because App 1 is running twice as many instances of SD1.

Referring back to FIG. 3, in one embodiment, the calculation module 306 calculates an actual Central Processing Unit (CPU) cycle percentage for a particular service domain 116. The calculation module 306 calculates "$X_s(T_k)$", the actual percentage of CPU cycles received by service domain s. In an unqualified goal scenario, the calculation module 306 may calculate the percentage "$X_s(T_k)$" for each service domain "s", by calculating:

$$X_s(T_k)=1/k[U_{1s}+U_{2s}+\ldots+U_{Ns}]/N+(k-1)/kX_s(T_{k-1})$$

where "k" is a decision instant counter, "$T_k$" is a specific time, "s" is the service domain 116, "N" is the number of appliances, "$U_{Ns}$" is CPU cycle percentage for the service domain 116 in appliance "N". In an overload protection scenario, the percentiles "Xs(Tk)" would be calculated separately over overload and underload periods.

In one embodiment, the threshold module 308 calculates an overhead threshold that determines whether to activate and deactivate service domain instances 118 in response to a failed performance goal 210. Because activating and deactivating a service domain 116 incurs some resource overhead, the user may wish to factor that overhead into the implementation plan 212. Therefore, in certain embodiments, a user may enable or disable the threshold module 308 that applies a threshold to exclude service domains 116 from activation/deactivation decisions.

The threshold module 308 may express a threshold as a vector of percentage tolerances as shown in FIG. 4C. If the achieved percentage for a given service domain "s" is below its target by less than "$DT_s$" units, the threshold module 308 may flag the domain so that the determination module 206 will not consider the service domain 116 for activation, thus saving the activation overhead. Similarly, if the achieved percentage for a given service domain "s" is above its target by less than "$UT_s$" units, the threshold module 308 may flag the domain so that the determination module 206 will not consider the domain for deactivation, thus saving the deactivation overhead. Therefore, if "$P_s-DT_s<X_s(T_k)<P_s+UT_s$," the threshold module 308 may consider that service domain s is sufficiently close to its desired goal; such service domains 116 will be excluded from activation/deactivation considerations.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
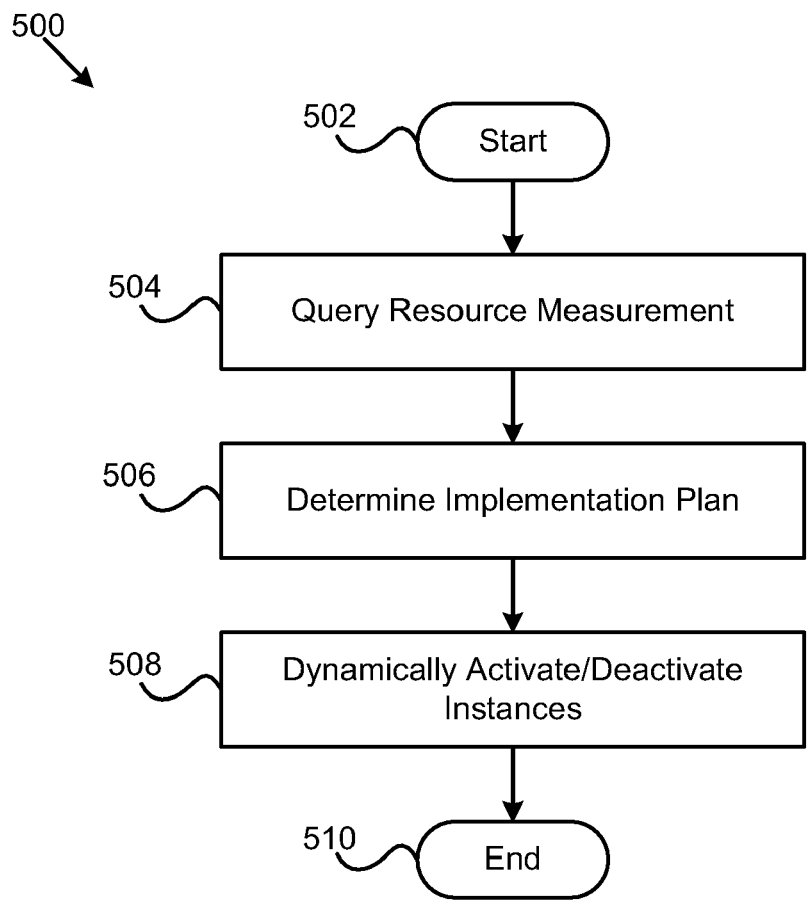
FIG. 5 is a schematic flow chart diagram illustrating one embodiment of a method for dynamically provisioning clusters of middleware appliances.

FIG. 5 illustrates one embodiment of a method 500 for dynamically provisioning clusters of middleware appliances. The method 500 starts 502 when the reference module 202 queries 504 a resource measurement from a middleware appliance cluster 108. Next, the determination module 206 determines 506 an implementation plan 212 based on a performance goal 210 and one or more resource calculations. The implementation plan 212 will dictate which service domains 116 to activate and deactivate on each appliance 108. Finally, the implementation module 208 dynamically enables and disables 508 the service domain instances 118 on the appliance cluster 108 based on the implementation plan 212. Then the method 500 ends 510.

Figure 6:
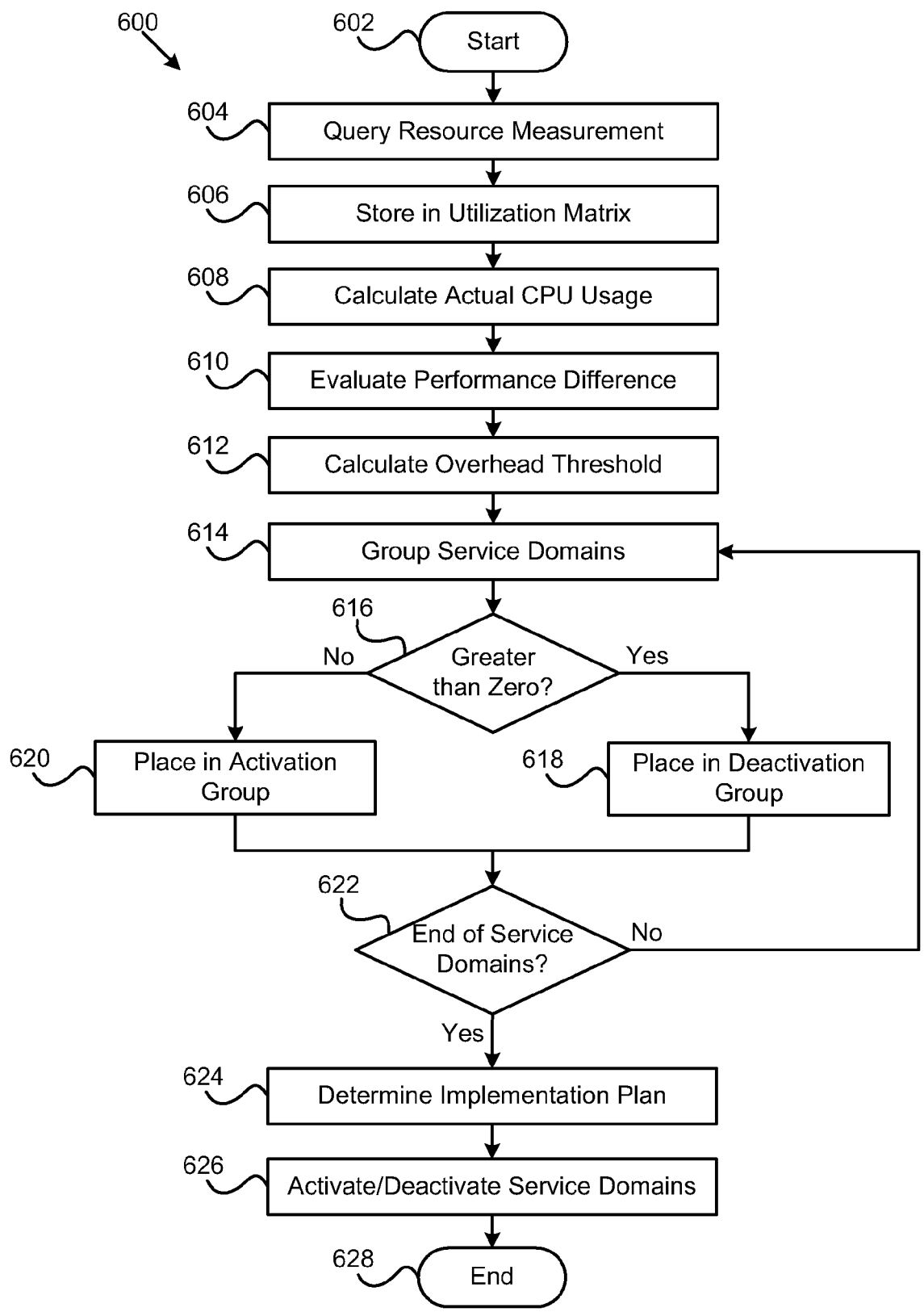
FIG. 6 is a detailed schematic flow chart diagram illustrating one embodiment of a method for dynamically provisioning clusters of middleware appliances.

FIG. 6 illustrates a detailed embodiment of a method 600 for dynamically provisioning clusters of middleware appliances. First, the method 600 starts 602 when the reference module 202 queries 604 a resource measurement from the cluster of appliances 108. This resource measurement measures the CPU processing resources consumed by each service domain 116 across the appliances 108. The utilization module 302 stores 606 the resource measurement in a utilization matrix. The calculation module 306 then calculates 608 an actual Central Processing Unit (CPU) cycle percentage for a service domain 116.

Next, the evaluation module 204 evaluates 610 a performance difference between the resource measurement for each appliance 108 and a performance goal 210. The performance goal 210 maybe an unqualified goal or an overload protection goal. Then, the threshold module 308 calculates 610 an overhead threshold to for each service domain 116 to determine whether to activate and deactivate the corresponding service domain instances 118 if the appliance cluster 108 has not met the performance goal 210. If the service domain is sufficiently close to its performance goal 210, the domain will be excluded from activation/deactivation considerations.

The determination module 206 then groups 614 each service domain 116 based on the performance difference. Specifically, the determination module 206 determines 616 that the difference is greater than zero. Because the difference is greater than zero, the service domain 116 meets its performance goal 210. Therefore, the service domain 116 could be deactivated in some or all of the appliances 108. As a result, the determination module 206 places 618 the service domain 116 into the deactivation group.

Alternatively, if the determination module 206 determines 616 that the difference is less than zero, the service domain 116 does not meet its performance goal 210 and the determination module 206 places 620 the service domain 116 in the activation group. The determination module 206 then determines 622 that another service domain 116 needs grouping and proceeds to group 614 the service domain 116. Alternatively, the determination module 206 determines 622 that all service domains 116 have been grouped.

Then, the determination module 206 determines 624 an implementation plan 212 based on the grouping of the service domains 116 and the performance goal 210. The implementation plan 212 designates which service domains 116 to activate and deactivate on the cluster of appliances 108. Finally, the implementation module 208 dynamically activates and deactivates 626 the service domain instances 118 on the cluster of appliances 108 based on the implementation plan 212. Then, the method 600 ends 628.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for dynamically provisioning clusters of middleware appliances, the method comprising:
referencing a resource measurement from a plurality of middleware appliances, the middleware appliances processing one or more service domains, the resource measurement comprising processing resources consumed by each middleware appliance for each of the one or more service domains, each service domain comprising one or more service domain instances, each service domain instance comprising a replica of a service domain;
determining an implementation plan based on a performance goal and one or more resource calculations, the implementation plan designating service domain instances to activate and designating service domain instances to deactivate on the plurality of middleware appliances, the performance goal comprising target processing resource usage for the one or more service domains; and
dynamically activating service domain instances and deactivating service domain instances on the plurality of middleware appliances based on the implementation plan.

2. The method of claim 1, further comprising evaluating a performance difference comprising a difference between the resource measurement for each middleware appliance and the performance goal.

3. The method of claim 1, wherein the wherein the implementation plan implements one or more of service differentiation and spatial locality.

4. The method of claim 1, wherein the performance goal is selected from the group consisting of an unqualified goal and an overload protection goal.

5. The method of claim 1, further comprising storing the resource measurement in a utilization matrix, the utilization matrix configured to record Central Processing Unit (CPU) usage for a service domain for each middleware appliance.

6. The method of claim 1, wherein one of the one or more resource calculations comprises calculating an actual Central Processing Unit (CPU) cycle percentage for a service domain, wherein the actual CPU cycle percentage for a service domain is calculated as in equation below:

$$X_s(T_k) = 1/k[U_{1s} + U_{2s} + \ldots + U_{Ns}]/N + (k-1)/k X_s(T_{k-1})$$

where k is a decision instant counter, $T_k$ is a specific time, s is the service domain, N is a number of middleware appliances, and $U_{Ns}$ is a CPU cycle percentage for the service domain in middleware appliance N.

7. The method of claim 6, wherein the actual CPU cycle percentage for a service domain is calculated in an overload condition and in an underload condition.

8. The method of claim 1, wherein one of the one or more resource calculations comprises calculating an overhead threshold, the overhead threshold configured to control activation of service domain instances and deactivation of service domain instances in response to a failed performance goal.

9. A hardware implemented computer program product for dynamically provisioning clusters of Service Oriented Architecture (SOA) appliances, the computer program product comprising:
a computer readable storage medium having instructions stored thereon which, when executed by a processor within a computer, implement the following modules, comprising:
a reference module configured to reference a resource measurement from the plurality of SOA appliances, the SOA appliances processing one or more service domains, the resource measurement comprising Central Processing Unit (CPU) resources consumed by each SOA appliance for each of the one or more service domains, each service domain comprising one or more service domain instances, each service domain instance comprising a replica of a service domain;
a determination module configured to determine an implementation plan based on a performance goal and one or more resource calculations, the implementation plan specifying service domain instances to activate and specifying service domain instances to deactivate on the plurality of SOA appliances, the performance goal comprising target CPU usage for the one or more service domains, wherein the implementation plan implements one or more of service differentiation and spatial locality; and
an implementation module configured to dynamically activate service domain instances and deactivate service domain instances on the plurality of SOA appliances based on the implementation plan.

10. The computer program product of claim 9, further comprising a utilization module configured to store the resource measurement in a utilization matrix, the utilization matrix configured to record Central Processing Unit (CPU) usage for a service domain for each SOA appliance.

11. The computer program product of claim 9, further comprising an instantiation module configured to represent the service domain instances for each SOA appliance in an instantiation matrix.

12. The computer program product of claim 9, further comprising a calculation module configured to calculate an actual Central Processing Unit (CPU) cycle percentage for a service domain.

13. The computer program product of claim 12, wherein the actual CPU cycle percentage for a service domain is calculated as in equation below:

$$X_s(T_k) = 1/k[U_{1s} + U_{2s} + \ldots + U_{Ns}]/N + (k-1)/k X_s(T_{k-1})$$

where k is a decision instant counter, $T_k$ is a specific time, s is the service domain, N is a number of the SOA appliances, $U_{Ns}$ is a CPU cycle percentage for the service domain in SOA appliance N.

14. The computer program product of claim 13, wherein the actual CPU cycle percentage for a service domain is calculated in an overload condition and in an underload condition.

15. The computer program product of claim 9, wherein the determination module further comprises a threshold module configured to calculate an overhead threshold, the overhead threshold configured to control activation of service domain instances and deactivation of service domain instances in response to a failed performance goal.

16. A system for dynamically provisioning clusters of Service Oriented Architecture (SOA) appliances, the system comprising:
a computer readable storage medium having instructions stored thereon which, when executed by a processor within a computer, implement the following modules, comprising:
a provisioning agent, implemented within the computer, wherein the provisioning agent is in communication with an internal network, the provisioning agent comprising:
a reference module configured to reference a resource measurement from the plurality of Service Oriented Architecture (SOA) appliances, the SOA appliances processing one or more service domains, the resource measurement comprising Central Processing Unit (CPU) resources consumed by each SOA appliance for each of the one or more service domains, each service domain comprising one or more service domain instances, each service domain instance comprising a replica of a service domain and comprising one or more communication ports;
a determination module configured to determine an implementation plan based on a performance goal and one or more resource calculations, the implementation plan specifying service domain instances to activate and specifying service domain instances to deactivate on the plurality of SOA appliances, the performance goal comprising target CPU usage for the one or more service domains, wherein the implementation plan implements one or more of service differentiation and spatial locality; and
an implementation module configured to dynamically activate service domain instances and deactivate service domain instances on the plurality of SOA appliances based on the implementation plan.

17. The system of claim 16, wherein the provisioning agent further comprises a utilization module configured to store the resource measurement in a utilization matrix, the utilization matrix configured to record Central Processing Unit (CPU) usage for a service domain for each SOA appliance.

18. The system of claim 16, wherein the provisioning agent further comprises an instantiation module configured to represent the service domain instances for each SOA appliance in an instantiation matrix.

19. The system of claim 16, further comprising a calculation module configured to calculate an actual Central Processing Unit (CPU) cycle percentage for a service domain.

20. The system of claim 16, wherein an HTTP Router/IP sprayer is configured to route HTTP requests to the one or more communication ports for each activated service domain instance.

21. The computer program product of claim 9, wherein each service domain instance comprises one or more communication ports configured to receive Hypertext Transfer Protocol (HTTP) requests from a HTTP Router/Internet Protocol (IP) sprayer, the modules further comprising:
a utilization module configured to store the resource measurement in a utilization matrix, the utilization matrix configured to record Central Processing Unit (CPU) usage for a service domain for each SOA appliance; and
an evaluation module configured to evaluate a performance difference comprising a difference between the resource measurement for each SOA appliance and the performance goal, wherein the performance goal is further selected from the group consisting of an unqualified goal and an overload protection goal.

22. The system of claim 16, wherein the provisioning agent further comprises an evaluation module configured to evaluate a performance difference comprising a difference between the resource measurement for each SOA appliance and the performance goal, wherein the performance goal is further selected from the group consisting of an unqualified goal and an overload protection goal.

* * * * *